United States Patent [19]

Kawaguchi et al.

[11] Patent Number: 4,729,643
[45] Date of Patent: Mar. 8, 1988

[54] TELEPHOTO ZOOM LENS SYSTEM FOR CAMERA

[75] Inventors: Isao Kawaguchi; Masakuni Tai; Shin Ikeda, all of Tokyo, Japan

[73] Assignee: Tokina Optical Co., Ltd., Tokyo, Japan

[21] Appl. No.: 821,445

[22] Filed: Jan. 22, 1986

[30] Foreign Application Priority Data

Jun. 12, 1985 [JP] Japan ................................ 60-125994

[51] Int. Cl.$^4$ ...................... G02B 15/16; G02B 9/64
[52] U.S. Cl. ..................................................... 350/427
[58] Field of Search ........................................ 350/427

[56] References Cited

U.S. PATENT DOCUMENTS 4,576,443  3/1986  Itoh .................... 350/427

Primary Examiner—Bruce Y. Arnold
Assistant Examiner—Rebecca D. Gass
Attorney, Agent, or Firm—Oblon, Fisher, Spivak, McClelland & Maier

[57] ABSTRACT

A telephoto zoom lens system comprises a first lens group having a positive refractive power, a second lens group having a negative refractive power, and a third lens group having a positive refractive power. In a zooming operation, the first lens group moves arithmetically, the second lens group moves from the objective side toward the image side in the first half of the movement and then from the image side toward the objective side in the latter half of movement, and the third lens group moves so as to maintain the image side focal point thereof in a fixed position in conjunction with the first and second lens groups.

1 Claim, 27 Drawing Figures

FIG_2
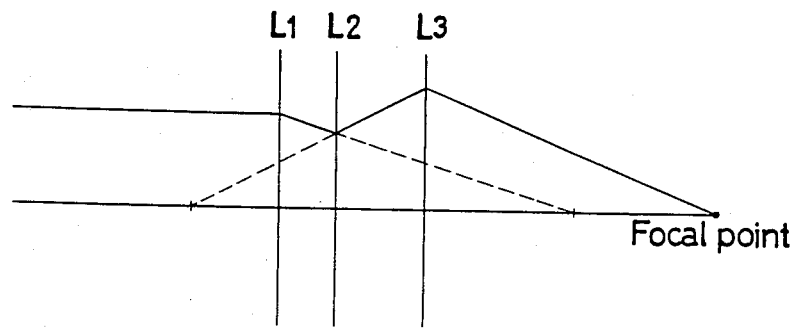
FIG_3
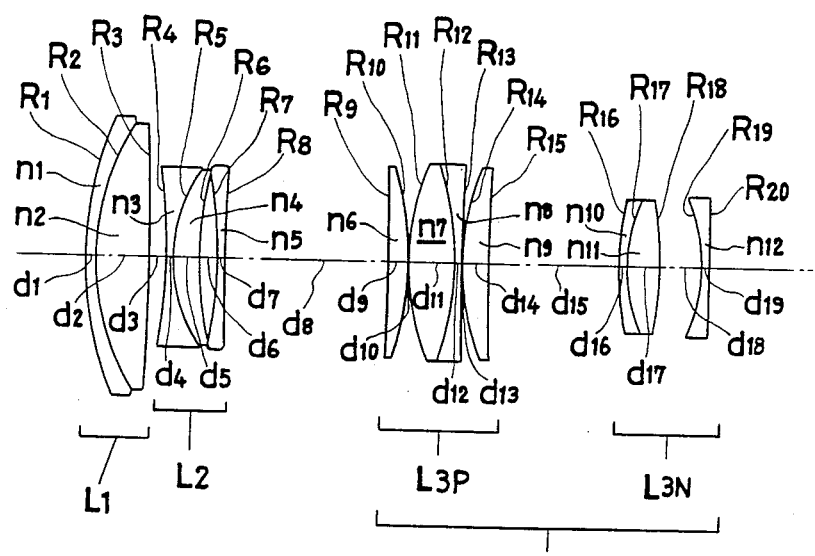
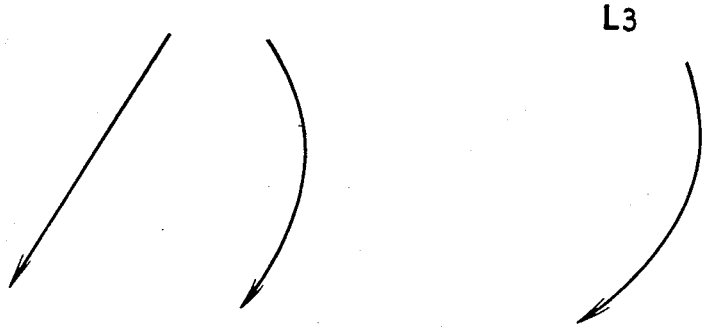

FIG. 9(a) (Spherical aberration)
—— d Line,  ---- F Line
f=71.97     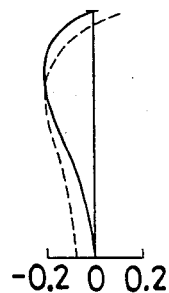
f=116.90    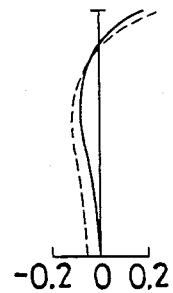
f=202.54    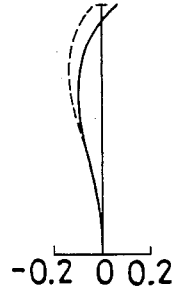
FIG. 9(b) (Astigmatic aberration)
—— Sagittal,  ---- Meridional
f=71.97     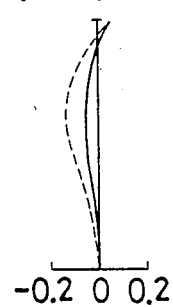
f=116.90    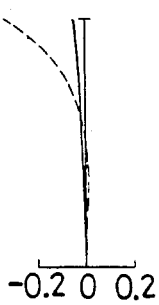
f=202.54    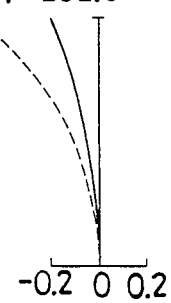
FIG. 9(c) (Distortion)
f=71.97     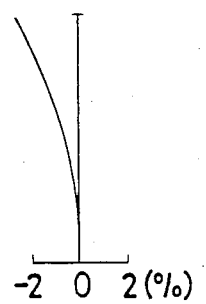
f=116.90    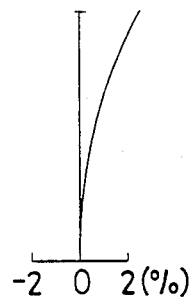
f=202.54    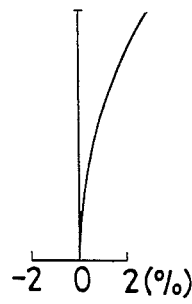

FIG.10(a)
(Spherical aberration)
—— d Line, ---- F Line
f=77.25     f=127.92     f=193.00
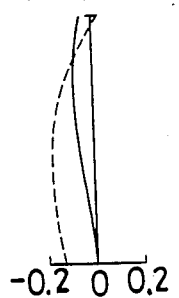 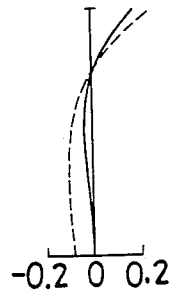 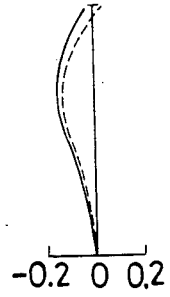
-0.2 0 0.2    -0.2 0 0.2    -0.2 0 0.2
FIG.10(b)
(Astigmatic aberration)
—— Sagittal, ---- Meridional
f=77.25     f=127.92     f=193.00
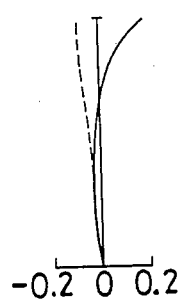 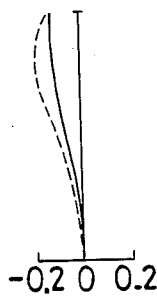 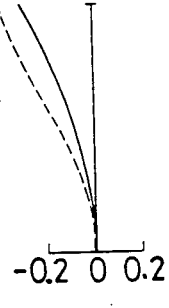
-0.2 0 0.2    -0.2 0 0.2    -0.2 0 0.2
FIG.10(c)
(Distortion)
f=77.25     f=127.92     f=193.00
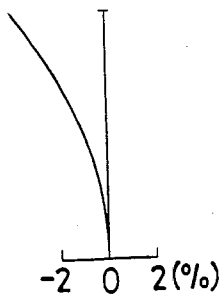 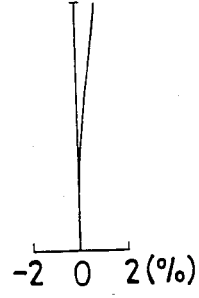 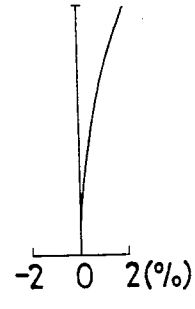
-2 0 2(%)    -2 0 2(%)    -2 0 2(%)

FIG. 12(a)
(Spherical aberration)
—— d Line, ---- F Line
f=72.10  f=117.09  f=203.69
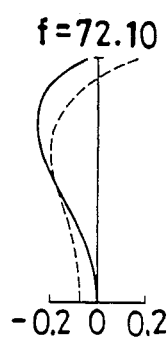
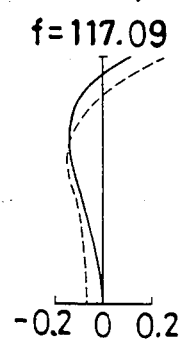
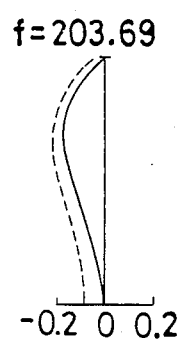
FIG. 12(b)
(Astigmatic aberration)
—— Sagittal, ---- Meridional
f=72.10  f=117.09  f=203.69
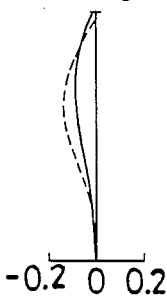
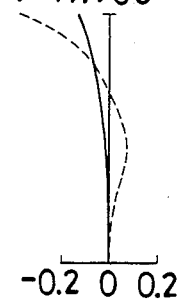
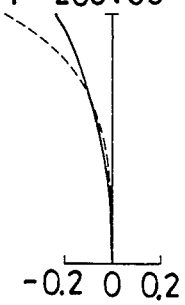
FIG. 12(c)
(Distortion)
f=72.10  f=117.09  f=203.69
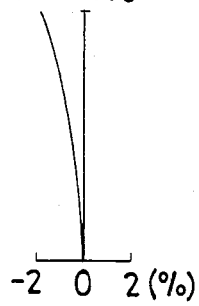
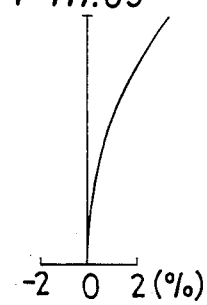
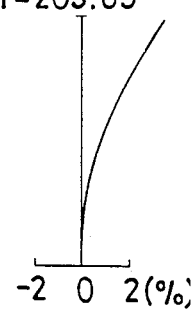

FIG_13(a)
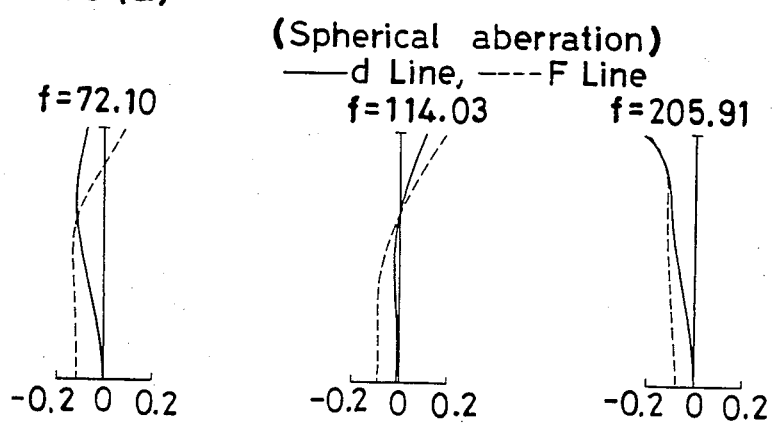
(Spherical aberration)
—— d Line, ---- F Line
FIG_13(b)
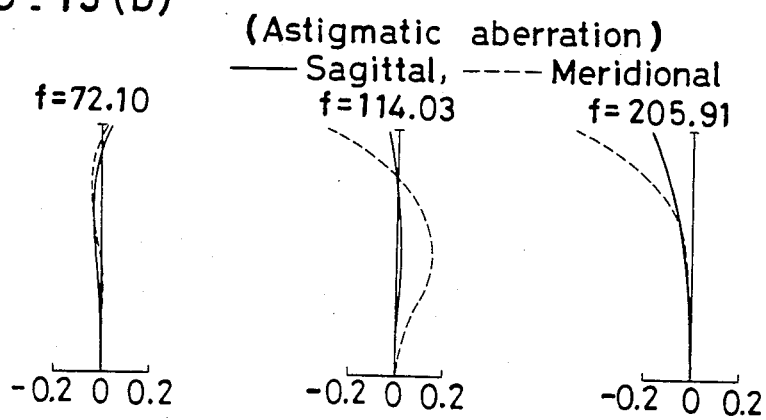
(Astigmatic aberration)
—— Sagittal, ---- Meridional
FIG_13(c)
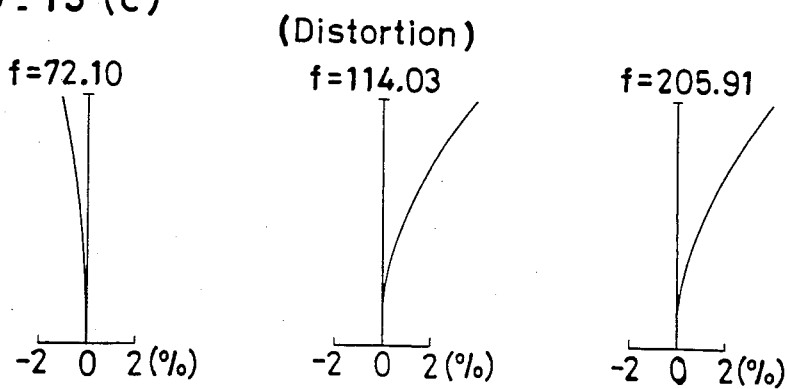
(Distortion)

TELEPHOTO ZOOM LENS SYSTEM FOR CAMERA

FIELD OF THE INVENTION AND RELATED ART STATEMENT

This invention relates to a telephoto zoom lens system for a camera composed of three groups of lenses.

FIGS. 1(a) and 1(b) show two examples of prior art zoom lens system. In each case, the zoom lens system comprises three lens groups, i.e., a first lens group $L_1$ having a positive refractive power, a second lens group $L_2$ having a negative refractive power and a third lens group $L_3$ having a positive refractive power, arranged from the objective side to the image side.

In the zooming operation of the first example as shown in FIG. 1(a), with the movement of the first lens group $L_1$, the third lens group $L_3$ undergoes an arithmetic movement and the second lens group $L_2$ undergoes a non-arithmetic movement so as to hold the image side focal point of the whole lens system in a fixed position. In the second example, with the movement of the first lens group $L_1$, the second lens group $L_2$ undergoes an arithmetic movement and the third lens group $L_3$ undergoes a non-arithmetic movement to hold the image side focal point of the whole lens system in a fixed position. Assuming that both of these zoom lenses have the same lens structure and are similar to each other in refractive power arrangement and aberration compensation at the wide angle end and telephoto end, the magnification of the third lens group $L_3$ is usually ×1 (equimultiple) or greater in a telephoto zoom lens system. In addition, since the magnification of the second lens group $L_2$ located midway between the wide-angle end and telephoto end is usually less than ×1, the positions of the second and third lens groups $L_2$ and $L_3$ midway therebetween are closer to the image side in the case of the second example than in the case of the first example. From the standpoint of the ratio of the angle of incidence of the light beam on the first lens group $L_1$ to the respective angles of incident of the light beams on the second and third lens groups $L_2$ and $L_3$ at the midway position, the light beam incident on the first lens group $L_1$ is larger in angle of incidence in the second example than in the first example. This means that the first and second examples are different from each other in the aberration at the midway position and, usually, the second example has a greater under-aberration tendency at the midway position than that in the first example, because the specific aberration of the first lens group $L_1$ has an under-aberration tendency both on the axis and outside the axis.

Meanwhile, the image-focusing relation of the three lens groups in the zoom lens system to one another is as schematically shown in FIG. 2. It will be understood from this image-focusing relation that in order to reduce the total axial length of the lens system while maintaining adequate distances among adjacent lens groups, it is desirable to reduce the refractive power of the second lens group $L_2$ while increasing the refractive power of the third lens group $L_3$. However, for the prevention of the deterioration of the peripheral light quantity in the field of view, the refractive power of the third lens group $L_3$ must be increased, because the refractive power of the second lens group $L_2$ cannot be made too low. In this case, if the focal distance of the whole lens system is fixed without variation of the magnification of the third lens group $L_3$, the distance between the second and third lens groups $L_2$ and $L_3$ is reduced. In other words, the respective angles of incidence of light beams to the first and second lens groups $L_1$ and $L_2$ are increased with reducing angle of incidence of the light beam on the third lens group $L_3$. Therefore, due to the influence of the second lens group $L_2$ having a high refractive power, the over-aberration tendency remains at the midway position both on the axis and outside the axis even where the compensation for the aberration is sufficiently made at the wide angle end and telephoto end.

From the above, the second example would be preferred to the first example for providing a compact zoom lens system composed of the three lens groups, whereas the second example has an upper limitation on the refractive power of the third lens group $L_3$, so that the focal distance of the third lens group is only of the order of the resultant focal distance of the overall lens system at the wide angle end. From the fact mentioned above, the lens construction composed of the three lens groups has been hitherto applied only to a wide angle zoom lens having a short focal distance because the lens groups can be moved relatively easily in the zooming operation. Though it may be applied to a zoom lens system of a high zoom ratio, such a lens system will require some other technique for attaining compactness, due to the amplifying function of the second and third lens groups.

OBJECT AND SUMMARY OF THE INVENTION

An object of the invention is to provide a telephoto zoom lens system for a camera, which has high magnification power but is nevertheless small in total length, overall size and weight.

To attain the above object of the invention, the telephoto zoom lens system according to the invention comprises from the objective side to the image side a first lens group having a positive refractive power, a second lens group having a negative refractive power and a third lens group having a positive refractive power, wherein the second lens group is moved in the direction opposite to the direction of movement of the first lens group on the wide angle end while it is moved in the same direction as the first lens group on the the telephoto end, whereby the angle of incidence of the light beam on the second lens group at the midway between the wide angle end and telephoto end is reduced.

With this arrangement, even if the focal distance of the third lens group is smaller than the resultant focal distance of the overall lens system at the wide angle end, the over-aberration tendency at the midway position is compensated for by the residual aberration subject to under-aberration of the first lens group. The telephoto zoom lens system according to the invention thus has a very small overall length and has a high zoom ratio compared to the prior art telephoto zoom lens.

The above and other objects and features of the invention will become more apparent from the description of the preferred embodiments thereof when the same is read with reference to the accompanying drawings.

BRIEF DESCRIPTION OF THE DRAWINGS

FIG. 2 is a view showing an image-focusing relation of a zoom lens consisting of three lens groups;

FIG. 3 is a schematic view showing a first embodiment of the telephoto zoom lens according to the invention;

FIG. 9(a) is the spherical aberration diagram of the first embodiment of the zoom lens;

FIG. 9(b) is the astigmatic aberration diagram of the first embodiment of the zoom lens;

FIG. 9(c) is the distortion diagram of the first embodiment of the zoom lens;

FIG. 10(a) is the spherical aberration diagram of the second embodiment of the zoom lens;

FIG. 10(b) is the astigmatic aberration diagram of the second embodiment of the zoom lens;

FIG. 10(c) is the distortion diagram of the second embodiment of the zoom lens;

FIG. 12(a) is the spherical aberration diagram of the fourth embodiment of the zoom lens;

FIG. 12(b) is the astigmatic aberration diagram of the fourth embodiment of the zoom lens;

FIG. 12(c) is the distortion diagram of the fourth embodiment of the zoom lens;

FIG. 13(a) is the spherical aberration diagram of the fifth embodiment of the zoom lens;

FIG. 13(b) is the astigmatic aberration diagram of the fifth embodiment of the zoom lens;

FIG. 13(c) is the distortion diagram of the fifth embodiment of the zoom lens;

DETAILED DESCRIPTION OF THE PREFERRED EMBODIMENTS

Figure 1A:
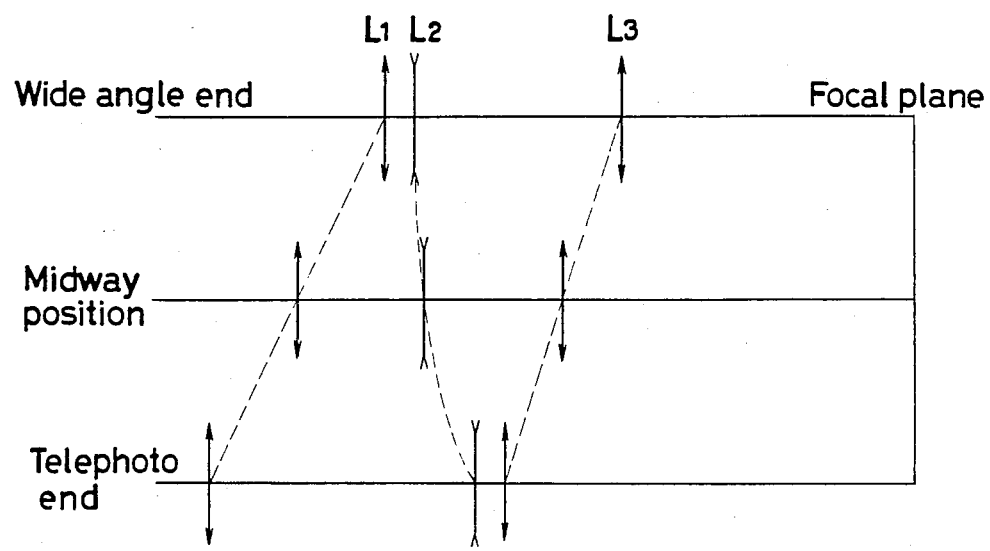
FIG. 1(a) is a view showing the concept underlying a prior art zoom lens.
Figure 1B:
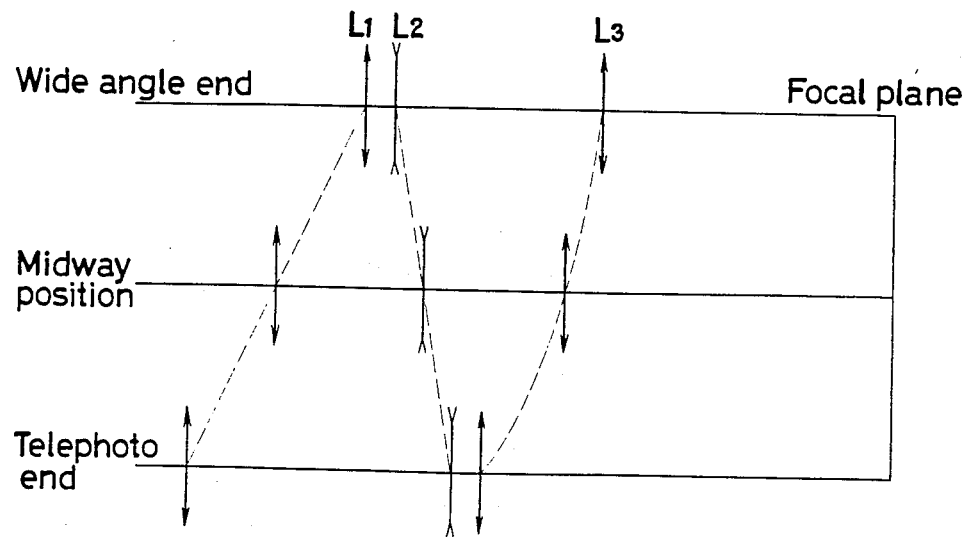
FIG. 1(b) is a view showing the concept underlying a different prior art zoom lens.
Figure 4:
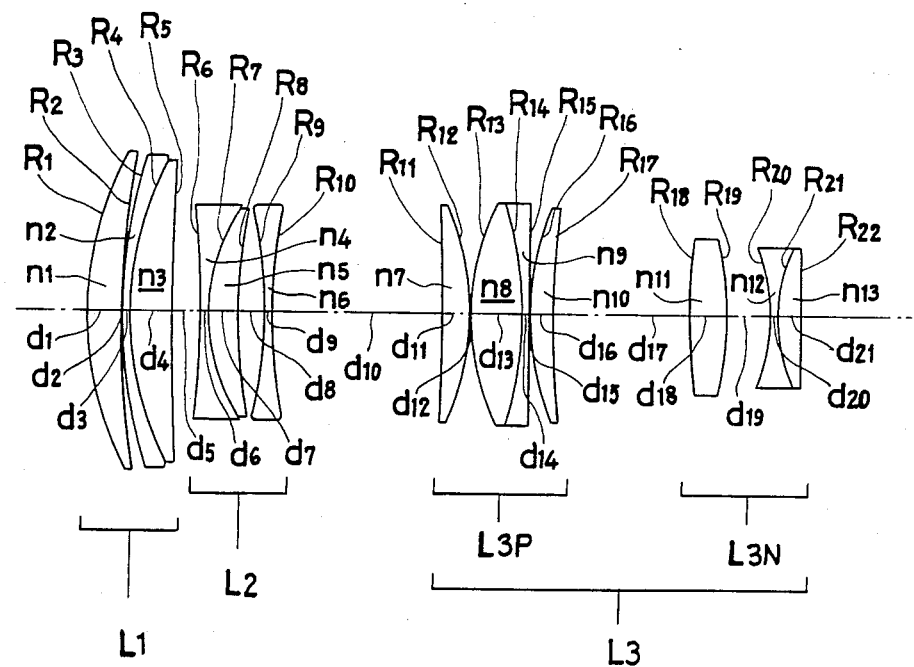
FIG. 4 is a schematic view showing a second embodiment of the telephoto zoom lens according to the invention.

A first embodiment of the zoom lens system according to the invention will now be described with reference to FIG. 3. The illustrated telephoto zoom lens system comprises from the objective side to the image side a first lens group $L_1$ having a positive refractive power, a second lens group $L_2$ having a negative refractive power and a third lens group $L_3$ having a positive refractive power. The third lens group $L_3$ is composed of at least an objective side positive lens subunit $L_{3P}$ including one or more negative lenses and an image side negative lens subunit $L_{3N}$ including one or more positive lenses. With this telephoto zoom lens system, when the zooming from the wide angle end toward the telephoto end is effected as shown in FIG. 4, the first lens group $L_1$ undergoes an arithmetic movement along the optical axis from the image side toward the objective side. As termed in this specification, "arithmetic movement" means movement of the lens group which is in direct proportion to the action causing the movement which may, for example, be the turning or linear moving of the lens barrel. With the movement of the first lens group $L_1$, the second lens group $L_2$ moves from the objective side toward the image side in the first half of the movement of the first lens group as illustrated in FIG. 4, and then, it moves from the image side toward the objective side in the latter half after the first lens group $L_1$ reaches the substantial midway portion in the whole moving range thereof as illustrated in FIG. 4. Simultaneously, the third lens group $L_3$ undergoes a non-arithmetic movement so as to maintain the image side focal point of the whole lens system in a fixed position in conjunction with the first and second lens groups $L_1$ and $L_2$.

The telephoto zoom lens system according to this invention satisfies the following conditions:

$$0.3 \cdot f_w \leq f_3 \leq 0.5 \cdot f_w \tag{1}$$

$$0.25 \cdot f_1 \leq |f_2| \leq 0.4 \cdot f_1 \tag{2}$$

$$f_w \leq f_1 \leq 2 \cdot f_w \tag{3}$$

$$1 \leq |M_3| \leq 2 \tag{4}$$

$$0.7 \leq |M_2| \leq 1.25 \tag{5}$$

$$\overline{n_N} > \overline{n_p} \tag{6}$$

$$\overline{\nu_{PP}} > \overline{\nu_{PN}} \tag{7}$$

$$\overline{\nu_{NN}} \leq \overline{\nu_{NP}} \tag{8}$$

where $f_1$, $f_2$ and $f_3$ represent the respective focal distances of the first to third lens groups $L_1$ to $L_3$; $f_w$ the resultant focal distance of the overall lens system at the wide angle end; $M_3$ the magnification of the third lens group $L_3$ at the wide angle end; $M_2$ the magnification of the second lens group $L_2$ at the telephoto end; $\overline{n_p}$ the average value of the refractive index of the positive lens in the third lens group $L_3$; $\overline{n_N}$ the average value of the refractive index of the negative lens in the third lens group; $\overline{\nu_{PP}}$ the average value of the Abbe's number of the positive lens in the positive lens group $L_{3P}$; $\overline{\nu_{PN}}$ the average value of the Abbe's number of the negative lens in the positive lens group $L_{3P}$; $\overline{\nu_{NP}}$ the average value of the Abbe's number of the positive lens in the negative lens group $L_{3N}$; and $\overline{\nu_{NN}}$ the average value of the Abbe's number of the negative lens in the negative lens group $L_{3N}$.

The conditions (1) to (8) described above will now be discussed in detail.

The condition (1) of $f_3 \leq 0.5 \cdot f_w$ is particularly necessary for realizing a compact lens system having a small overall length. When $f_3 < 0.3 \cdot f_w$, the second lens group $L_2$ becomes excessively spaced apart from the first lens group $L_1$ for the compensation for the aberration subject to over-aberration at the midway position between the wide angle end and telephoto end. As a result, the entrance pupil at the midway position must be spaced apart from the first lens group $L_1$, which degrades the peripheral light quantity at the midway position. For this reason, it is necessary that $0.3 \cdot f_w \leq f_3$.

The condition (2) of $0.25 \cdot f_1 \leq |f_2|$ is necessary for minimizing the diverging power of the second lens group $L_2$ while providing a compact lens structure. Also, the lens aperture of the lens system may be made rather large to prevent the deterioration of the peripheral light quantity which is caused by the excess of $|f_2|$ over $0.4 \cdot f_1$. For this reason, $|f_2|$ has to be $0.4 \cdot f_1$ or less.

The condition (3) defining $f_w \leq f_1 \leq 2 \cdot f_w$ is provided for the reason that when $f_1$ exceeds $2 \cdot f_w$, at a very small distance of the object, the extent of feed of the first lens group $L_1$ is increased, thus resulting in deterioration of the peripheral light quantity. When $f_1$ is less than $f_w$, the residual aberration of the first lens group $L_1$ is increased, making it difficult to balance the aberration on the axis with that outside the axis at the wide angle end. For this reason, there is provided the condition $f_1 > f_w$.

The condition (4) of $1 \leq |M_3| \leq 2$ is necessary for the reason that when $|M_3|$ is less than 1, the distance between the first and second lens groups $L_1$ and $L_2$ at the wide angle end is increased, whereby the peripheral light quantity is degraded. In addition, a value of $|M_3|$ above 2 is undesired because the focusing property of the third lens group $L_3$ located at the position thereof for a magnification of $\times 1$ (equimultiple) is appropriate for realizing a compact lens system.

The condition (5) of $|M_2| \leq 1.25$ is necessary for the reason that the third lens group $L_3$ should not be too high in magnification with respect to the first lens group $L_1$ so as not to interfere any other elements in the zooming operation although the magnification of the second lens group $L_2$ of the telephoto zoom lens is desirably as large as possible. On the other hand, the lens system having $|M_2|$ less than 0.7 is not a zoom lens of a high zoom ratio under the condition (2).

Even in the telephoto zoom lens which satisfies the above conditions, the telephoto ratio of the third lens group should be set to so small as to maintain an adequate air gap between the second and third lens groups $L_2$ and $L_3$ at the telephoto end. Further, with increase of the refractive power of the third lens group $L_3$, the angle of incidence of the light beam on the third lens group $L_3$ becomes small compared with those on the first and second lens groups $L_1$ and $L_2$. Therefore, to maintain an adequate Petzval's sum, the average value $n_p$ of the positive lens refractive power of the third lens group $L_3$ should be smaller than the average $n_N$ of the negative lens refractive power. The condition (6) is necessary for this reason.

Further, the positive lens group $L_{3P}$ of the third lens group $L_3$ is adapted particularly to compensate for the chromatic aberration on the axis, while compensation for the chromatic aberration of the magnification is particularly carried out in the negative lens group $L_{3N}$. The average value $\overline{v_{PP}}$ of the Abbe's number of the positive lens is greater than the average value $\overline{v_{PN}}$ of the Abbe's number of the negative lens, while the average value $\overline{v_{NN}}$ of the Abbe's number of the negative lens is greater than the average value $\overline{v_{NP}}$ of the Abbe's number of the position lens.

Examples of the invention are given below. In these examples, f represents the resultant focal distance of the overall lens system; $f_1$, $f_2$ and $f_3$ the respective focal distances of the first to third lens groups $L_1$ to $L_3$; R the radius of curvature of the lens; d the axial distance or thickness of the lens; n the refractive index of glass used for the lens; $v$ the Abbe's number of glass used for the lens; R, d, n and $v$ symbols provided in the order from the objective side to the image side; $M_3$ the magnification of the third lens group $L_3$ at the wide angle end; and $M_2$ the magnification of the second lens $L_2$ group at the wide angle end.

Example 1: Corresp. to FIG. 3 (Lens Structure) and FIG. 9 (Aberration Diagram)

| (f = 71.97~202.54 | | FNo. = 4.12~5.78) | |
|---|---|---|---|
| | R | d | n | $v$ |
| 1 | 48.907 | 1.40 | 1.80518 | 25.4 |
| 2 | 34.577 | 7.21 | 1.51680 | 64.2 |
| 3 | −261.273 | dIII | | |
| 4 | −73.159 | 1.00 | 1.69680 | 55.5 |
| 5 | 20.850 | 3.61 | 1.80518 | 25.4 |
| 6 | 51.473 | 2.45 | | |
| 7 | −57.152 | 1.00 | 1.60311 | 60.7 |
| 8 | 300.927 | dVIII | | |
| 9 | −2021.958 | 2.73 | 1.48749 | 70.1 |
| 10 | −52.159 | 0.11 | | |
| 11 | 32.396 | 6.37 | 1.51680 | 64.2 |
| 12 | −42.248 | 1.00 | 1.80518 | 25.4 |
| 13 | 295.543 | 0.25 | | |
| 14 | 37.316 | 3.56 | 1.51680 | 64.2 |
| 15 | 9135.126 | 17.90 | | |
| 16 | 59.483 | 1.00 | 1.74400 | 44.7 |
| 17 | 19.513 | 4.25 | 1.59270 | 35.3 |
| 18 | −60.312 | 5.80 | | |
| 19 | −20.160 | 1.00 | 1.69680 | 55.5 |
| 20 | −274.291 | | | |

($f_1$ = 98.959  $f_2$ = −29.800  $f_3$ = 31.500)

| | Back-focus Length | Total Optical Length |
|---|---|---|
| W | 44.944 | 130.03 |
| T | 65.867 | 158.20 |

| | f | dIII | dVIII |
|---|---|---|---|
| W | 71.97 | 2.247 | 22.200 |
| M | 116.90 | 21.734 | 12.960 |
| T | 202.54 | 30.421 | 1.277 |

$|M_3|$ = 1.433
$|M_2|$ = 0.976

Example 2: Corresp. to FIG. 4 (Lens Structure) and FIG. 10 (Aberration Diagram)

| (f = 77.25~193.00 | | FNo. = 3.60~4.61) | |
|---|---|---|---|
| | R | d | n | $v$ |
| 1 | 45.802 | 4.60 | 1.51742 | 52.4 |
| 2 | 130.896 | 0.30 | | |
| 3 | 78.152 | 1.00 | 1.80518 | 25.4 |
| 4 | 43.134 | 5.80 | 1.51680 | 64.2 |
| 5 | 457.905 | dV | | |
| 6 | −96.922 | 1.00 | 1.69680 | 55.5 |
| 7 | 25.500 | 4.10 | 1.80518 | 25.4 |
| 8 | 76.588 | 3.50 | | |
| 9 | −54.646 | 1.00 | 1.60311 | 60.7 |
| 10 | 79.923 | dX | | |
| 11 | −249.862 | 3.60 | 1.48749 | 70.1 |
| 12 | −36.934 | 0.30 | | |
| 13 | 35.257 | 6.80 | 1.48749 | 70.1 |
| 14 | −49.715 | 1.00 | 1.80518 | 25.4 |
| 15 | −1681.074 | 0.30 | | |
| 16 | 38.821 | 3.00 | 1.48749 | 70.1 |
| 17 | 104.753 | 18.50 | | |
| 18 | 89.722 | 5.00 | 1.51454 | 54.7 |
| 19 | −47.730 | 6.00 | | |
| 20 | −26.000 | 1.00 | 1.78590 | 44.2 |
| 21 | 23.028 | 3.00 | 1.72825 | 28.5 |
| 22 | −807.706 | | | |

($f_1$ = 100.00  $f_2$ = −30.00  $f_3$ = 33.00)

-continued

Example 2: Corresp. to FIG. 4 (Lens Structure) and FIG. 10 (Aberration Diagram)

| | Back-focus Length | Total Optical Length |
|---|---|---|
| W | 43.272 | 140.30 |
| T | 63.216 | 162.49 |

| | f | dV | dX |
|---|---|---|---|
| W | 77.25 | 3.924 | 23.305 |
| M | 127.92 | 22.021 | 12.415 |
| T | 193.00 | 26.117 | 3.361 |

|M₃| = 1.356
|M₂| = 0.984

Figure 5:
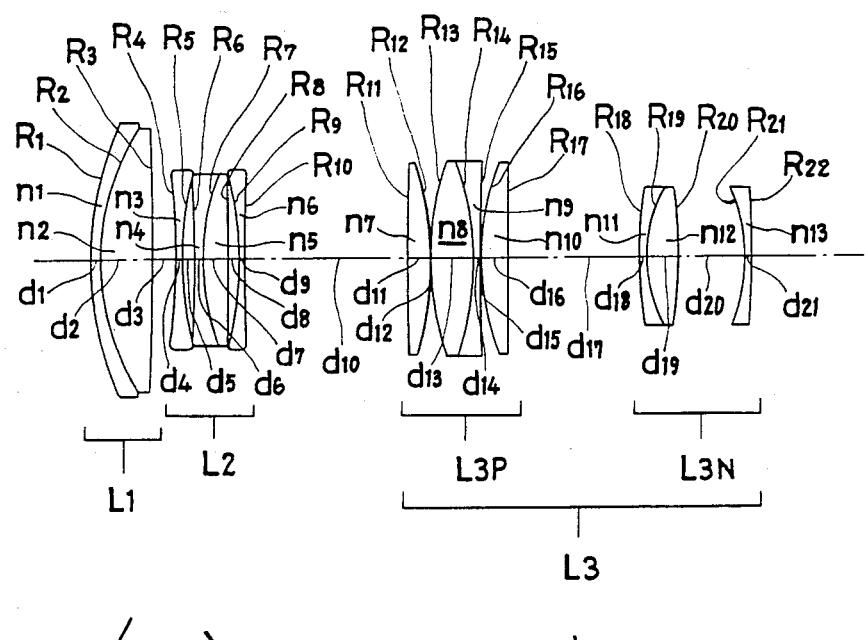
FIG. 5 is a schematic view showing a third embodiment of the telephoto zoom lens according to the invention.
Figure 11A:
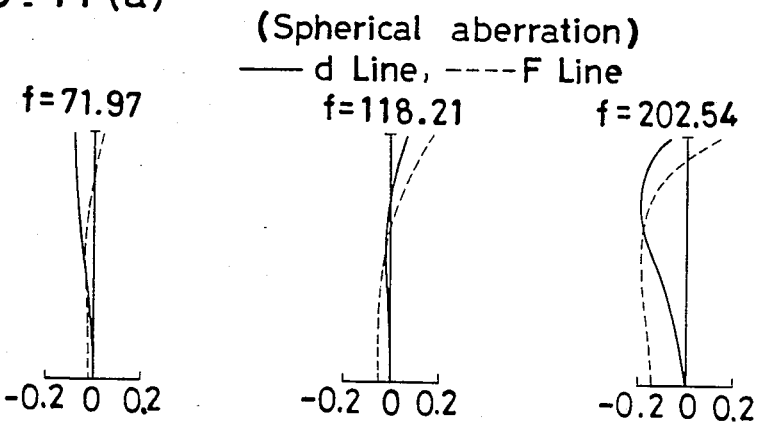
FIG. 11(a) is the spherical aberration diagram of the third embodiment of the zoom lens.
Figure 11B:
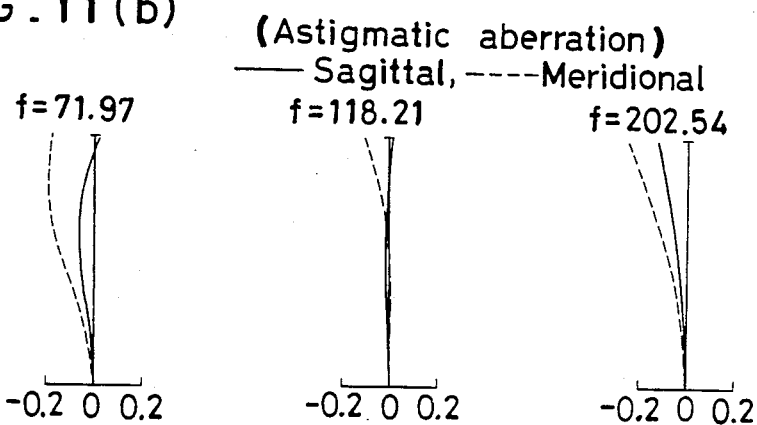
FIG. 11(b) is the astigmatic aberration diagram of the third embodiment of the zoom lens.
Figure 11C:
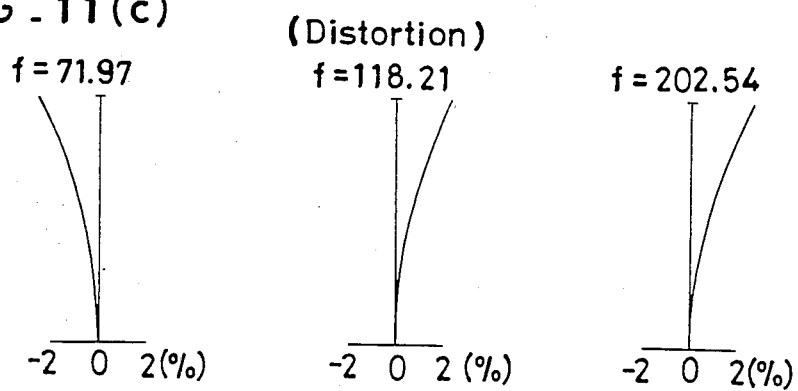
FIG. 11(c) is the distortion diagram of the third embodiment of the zoom lens.

Example 3: Corresp. to FIG. 5 (Lens Structure) and FIG. 11 (Aberration Diagram)

(f = 71.97~202.54    FNo. = 4.12~5.78)

| | R | d | n | ν |
|---|---|---|---|---|
| 1 | 47.017 | 1.40 | 1.80518 | 25.4 |
| 2 | 34.546 | 7.00 | 1.51680 | 64.2 |
| 3 | −439.705 | dIII | | |
| 4 | −95.125 | 1.00 | 1.69350 | 53.2 |
| 5 | 58.630 | 1.60 | | |
| 6 | −161.645 | 1.00 | 1.69350 | 53.2 |
| 7 | 32.668 | 3.60 | 1.78472 | 25.7 |
| 8 | −240.205 | 1.10 | | |
| 9 | −51.674 | 1.00 | 1.69350 | 53.2 |
| 10 | 505.180 | dX | | |
| 11 | 1289.983 | 2.90 | 1.48749 | 70.1 |
| 12 | −47.947 | 0.11 | | |
| 13 | 41.295 | 5.70 | 1.51680 | 64.2 |
| 14 | −39.960 | 1.00 | 1.80518 | 25.4 |
| 15 | 345.901 | 0.25 | | |
| 16 | 34.254 | 3.56 | 1.51680 | 64.2 |
| 17 | 704.282 | 17.90 | | |
| 18 | 64.837 | 1.00 | 1.74400 | 44.7 |
| 19 | 19.190 | 4.25 | 1.59270 | 35.3 |
| 20 | −64.982 | 9.00 | | |
| 21 | −21.305 | 1.00 | 1.69680 | 55.5 |
| 22 | −228.613 | | | |

(f₁ = 100  f₂ = −29.8  f₃ = 31.5)

| | Back-focus Length | Total Optical Length |
|---|---|---|
| W | 43.457 | 133.35 |
| T | 64.317 | 161.69 |

| | f | dIII | dX |
|---|---|---|---|
| W | 71.97 | 3.267 | 22.259 |
| M | 118.21 | 24.111 | 12.756 |
| T | 202.54 | 31.609 | 1.399 |

|M₃| = 1.427
|M₂| = 0.970

Figure 6:
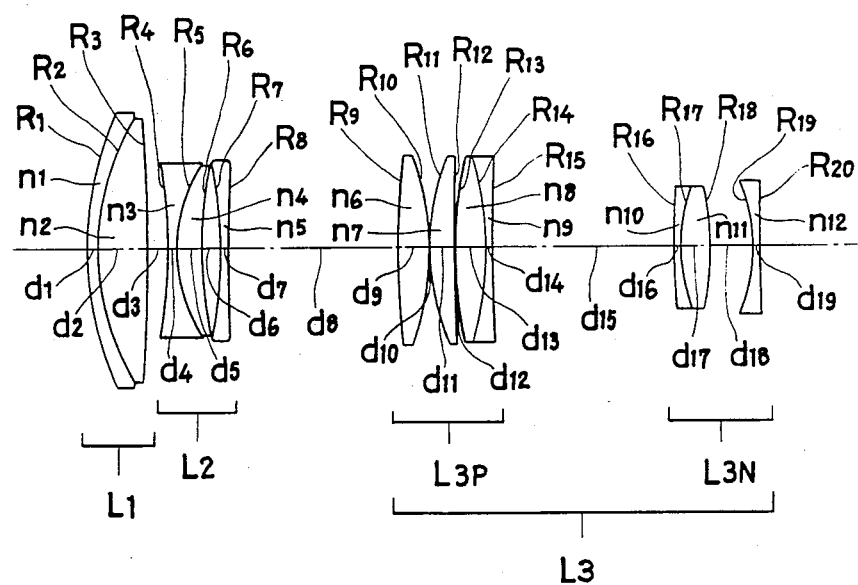
FIG. 6 is a schematic view showing a fourth embodiment of the telephoto zoom lens according to the invention.

Example 4: Corresp. to FIG. 6 (Lens Structure) and FIG. 12 (Aberration Diagram)

(f = 72.00~203.69    FNo. = 4.12~5.78)

| | R | d | n | ν |
|---|---|---|---|---|
| 1 | 49.952 | 1.40 | 1.80518 | 25.4 |
| 2 | 35.226 | 6.60 | 1.51680 | 64.2 |
| 3 | −250.496 | dIII | | |
| 4 | −71.500 | 1.00 | 1.69680 | 55.5 |
| 5 | 21.112 | 3.50 | 1.80518 | 25.4 |
| 6 | 55.050 | 2.60 | | |
| 7 | −54.597 | 1.00 | 1.60311 | 60.7 |
| 8 | 276.201 | dVIII | | |
| 9 | 105.240 | 4.10 | 1.48749 | 70.1 |
| 10 | −41.573 | 0.30 | | |
| 11 | 33.408 | 3.20 | 1.48749 | 70.1 |
| 12 | 217.507 | 0.30 | | |
| 13 | 71.381 | 4.10 | 1.48749 | 70.1 |
| 14 | −42.445 | 1.00 | 1.80518 | 25.4 |
| 15 | 417.237 | 25.00 | | |

-continued

Example 4: Corresp. to FIG. 6 (Lens Structure) and FIG. 12 (Aberration Diagram)

| | | | | |
|---|---|---|---|---|
| 16 | 145.651 | 1.00 | 1.74400 | 44.7 |
| 17 | 24.411 | 4.00 | 1.59270 | 35.3 |
| 18 | −33.860 | 5.80 | | |
| 19 | −22.841 | 1.00 | 1.69680 | 55.5 |
| 20 | −837.832 | | | |

(f₁ = 100  f₂ = −29.8  f₃ = 31.9)

| | Back-focus Length | Total Optical Length |
|---|---|---|
| W | 41.175 | 133.29 |
| T | 62.197 | 161.93 |

| | f | dIII | dVIII |
|---|---|---|---|
| W | 72.099 | 3.087 | 23.131 |
| M | 117.087 | 22.908 | 13.936 |
| T | 203.691 | 31.729 | 2.105 |

|M₃| = 1.434
|M₂| = 0.973

Figure 7:
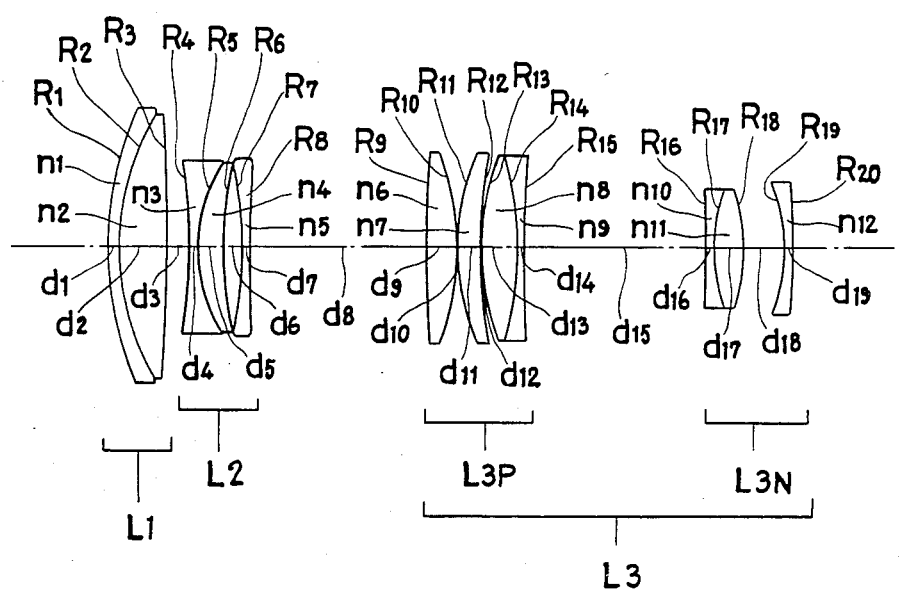
FIG. 7 is a schematic view showing a fifth embodiment of the telephoto zoom lens according to the invention.

Example 5: Corresp. to FIG. 7 (Lens Structure) and FIG. 13 (Aberration Diagram)

(f = 72.10~205.91    FNo. = 4.12~5.78)

| | R | d | n | ν |
|---|---|---|---|---|
| 1 | 49.855 | 1.40 | 1.80518 | 25.4 |
| 2 | 35.065 | 6.60 | 1.51680 | 64.2 |
| 3 | −249.785 | dIII | | |
| 4 | −72.800 | 1.00 | 1.69680 | 55.5 |
| 5 | 20.983 | 3.50 | 1.80518 | 25.4 |
| 6 | 53.274 | 2.60 | | |
| 7 | −57.838 | 1.00 | 1.60311 | 60.7 |
| 8 | 238.460 | dVIII | | |
| 9 | 230.948 | 4.10 | 1.48749 | 70.1 |
| 10 | −36.522 | 0.30 | | |
| 11 | 34.907 | 2.80 | 1.48749 | 70.1 |
| 12 | 82.936 | 0.30 | | |
| 13 | 36.394 | 5.00 | 1.48749 | 70.1 |
| 14 | −47.014 | 1.00 | 1.80518 | 25.4 |
| 15 | 230.855 | 25.00 | | |
| 16 | −198.632 | 1.00 | 1.74400 | 44.7 |
| 17 | 23.666 | 4.00 | 1.59270 | 35.3 |
| 18 | −25.587 | 5.80 | | |
| 19 | −19.438 | 1.00 | 1.69680 | 55.5 |
| 20 | −88.124 | | | |

(f₁ = 100  f₂ = −29.8  f₃ = 31.9)

| | Back-focus Length | Total Optical Length |
|---|---|---|
| W | 40.293 | 133.83 |
| T | 59.789 | 161.32 |

| | f | dIII | dVIII |
|---|---|---|---|
| W | 72.10 | 3.085 | 24.056 |
| M | 114.03 | 22.263 | 15.436 |
| T | 205.91 | 32.749 | 2.385 |

|M₃| = 1.434
|M₂| = 1.007

Figure 8:
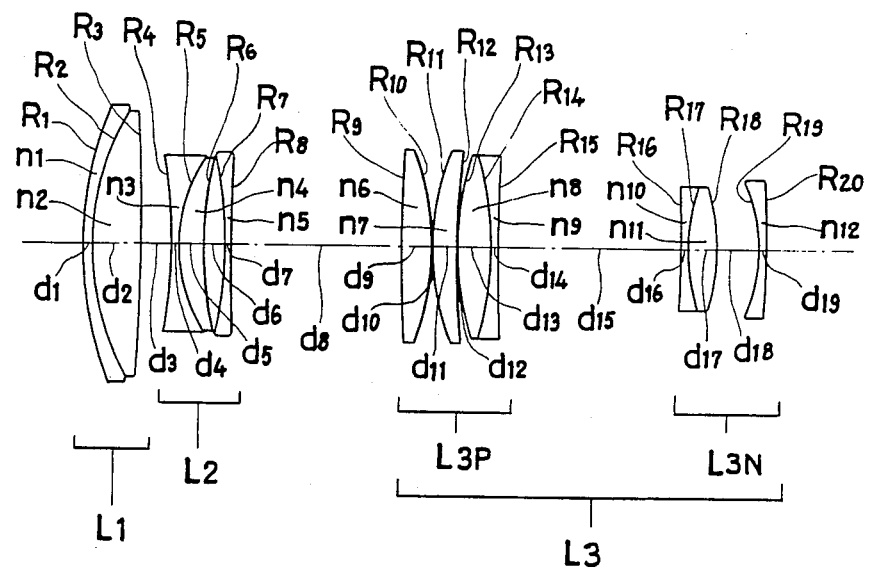
FIG. 8 is a schematic view showing a sixth embodiment of the telephoto zoom lens according to the invention.
Figure 14A:
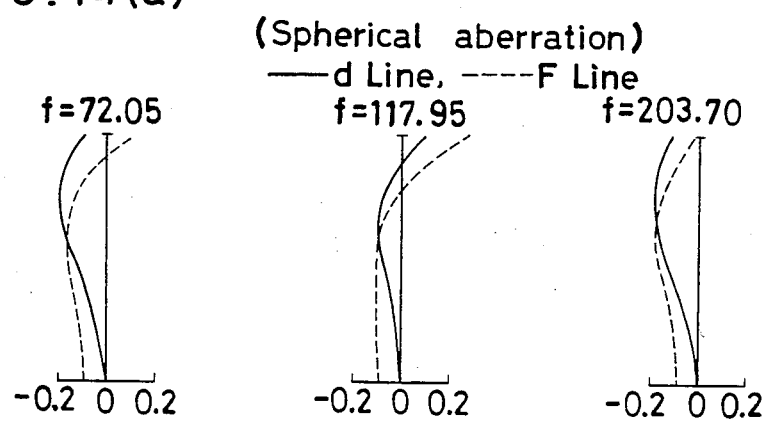
FIG. 14(a) is the spherical aberration diagram of the sixth embodiment of the zoom lens.
Figure 14B:
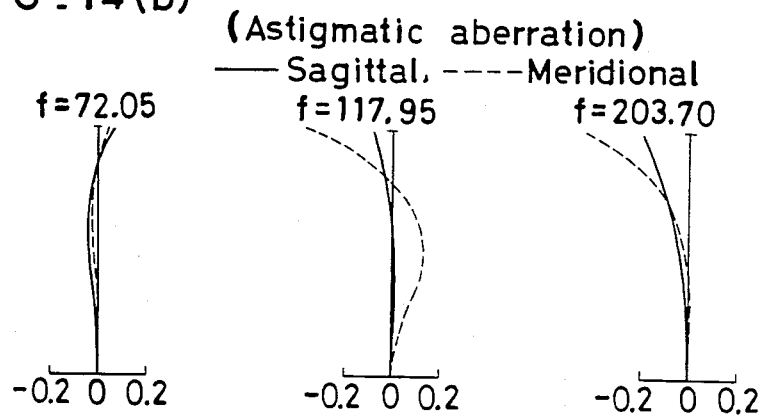
FIG. 14(b) is the astigmatic aberration diagram of the sixth embodiment of the zoom lens.
Figure 14C:
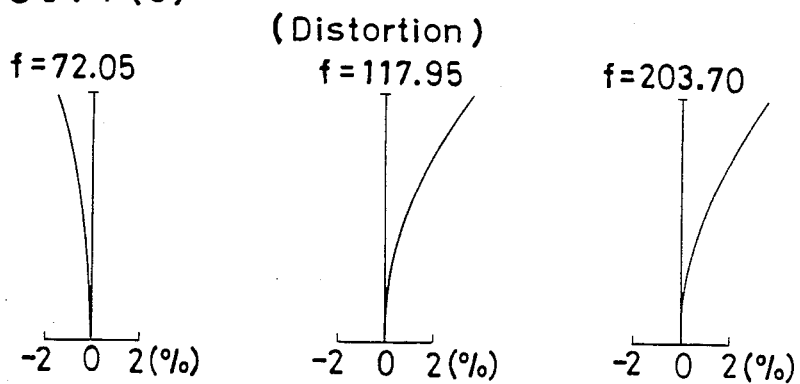
FIG. 14(c) is the distortion diagram of the sixth embodiment of the zoom lens.

Example 6: Corresp. to FIG. 8 (Lens Structure) and FIG. 14 (Aberration Diagram)

(f = 72.05~203.70    FNo. = 4.12~5.78)

| | R | d | n | ν |
|---|---|---|---|---|
| 1 | 50.231 | 1.40 | 1.80518 | 25.4 |
| 2 | 35.694 | 6.60 | 1.51680 | 64.2 |
| 3 | −252.543 | dIII | | |
| 4 | −73.421 | 1.00 | 1.69680 | 55.5 |
| 5 | 21.738 | 3.50 | 1.80518 | 25.4 |
| 6 | 54.818 | 2.60 | | |
| 7 | −51.034 | 1.00 | 1.60311 | 60.7 |
| 8 | 408.728 | dVIII | | |
| 9 | 231.716 | 4.10 | 1.48749 | 70.1 |
| 10 | −36.919 | 0.30 | | |
| 11 | 33.094 | 3.20 | 1.48749 | 70.1 |

-continued

Example 6: Corresp. to FIG. 8 (Lens Structure) and FIG. 14 (Aberration Diagram)

| | | | | |
|---|---|---|---|---|
| 12 | 97.288 | 0.30 | | |
| 13 | 42.705 | 4.30 | 1.48749 | 70.1 |
| 14 | −46.511 | 1.00 | 1.80518 | 25.4 |
| 15 | 296.242 | 25.00 | | |
| 16 | −342.143 | 1.00 | 1.74400 | 44.7 |
| 17 | 25.003 | 4.00 | 1.59270 | 35.3 |
| 18 | −27.813 | 5.80 | | |
| 19 | −20.345 | 1.00 | 1.69680 | 55.5 |
| 20 | −103.317 | | | |

($f_1$ = 100  $f_2$ = −29.8  $f_3$ = 31.9)

| | Back-focus Length | Total Optical Length |
|---|---|---|
| W | 39.765 | 133.48 |
| T | 61.576 | 161.79 |

| | f | dIII | dVIII |
|---|---|---|---|
| W | 72.05 | 4.06 | 23.56 |
| M | 117.95 | 23.06 | 14.06 |
| T | 203.70 | 31.73 | 2.39 |

$|M_3|$ = 1.409
$|M_2|$ = 0.973

As has been described in the foregoing, the distance from the first plane at the wide angle end to the imaging point is about 130 to 140 mm as shown in the above embodiments. When the lens is used as a telephoto zoom lens for single-lens reflex cameras, a lens barrel having a length less than 100 mm can be used. Thus, it is possible to realize an extremely compact structure compared to the prior art telephoto zoom lens. The structure thus has an advantage that it enjoys high operability and portability and can be manufactured inexpensively.

What is claimed is:

1. A telephoto zoom lens system comprising from the objective side to the image side a first lens group having a positive refractive power, a second lens group having a negative refractive power and a third lens group having a positive refractive power, said third lens group being composed of an objective side positive lens subgroup and an image side negative lens subgroup, wherein upon zooming from the wide angle end toward the telephoto end, said first lens group moves along the optical axis from the image side toward the objective side, said second lens group first moves from the objective side toward the image side in the first half of movement and then moves from the image side toward the objective side in the latter half of movement, and said third lens group moves so as to maintain the image side focal point thereof in a fixed position of the overall lens system in conjunction with said first and second lens groups, said telephoto zoom lens satisfying the following conditions:

$$0.3 \cdot f_w \leq f_3 \leq 0.5 \cdot f_w \quad (1)$$

$$0.25 \cdot f_1 \leq |f_2| \leq 0.4 \cdot f_1 \quad (2)$$

$$f_w \leq f_1 \leq 2 \cdot f_w \quad (3)$$

$$1 \leq |M_3| \leq 2 \quad (4)$$

$$0.7 \leq |M_2| \leq 1.25 \quad (5)$$

$$n_N > n_P \quad (6)$$

$$\overline{\nu_{PP}} > \overline{\nu_{PN}} \quad (7)$$

$$\overline{\nu_{NN}} \geq \overline{\nu_{NP}} \quad (8)$$

where $f_1$, $f_2$ and $f_3$ represent the respective focal distances of said first to third lens group; $f_w$ the resultant focal distance of the overall lens system at the wide angle end; $M_3$ the magnification of the third lens group at the wide angle end; $M_2$ the magnification of the second lens group at the telephoto end; $\overline{n_p}$ the average value of the refractive index of the positive lens in said third lens group; $\overline{n_N}$ the average value of the refractive index of the negative lens in said third lens group; $\overline{\nu_{PP}}$ the average value of the Abbe's number of the positive lens in said positive lens subgroup; $\overline{\nu_{PN}}$ the average value of the Abbe's number of the negative lens subgroup; $\overline{\nu_{NP}}$ the average value of the Abbe's number of the positive lens in said negative lens subgroup; and $\overline{\nu_{NN}}$ the average value of the Abbe's number of the negative lens in said negative lens subgroup.

* * * * *